Patented June 30, 1942

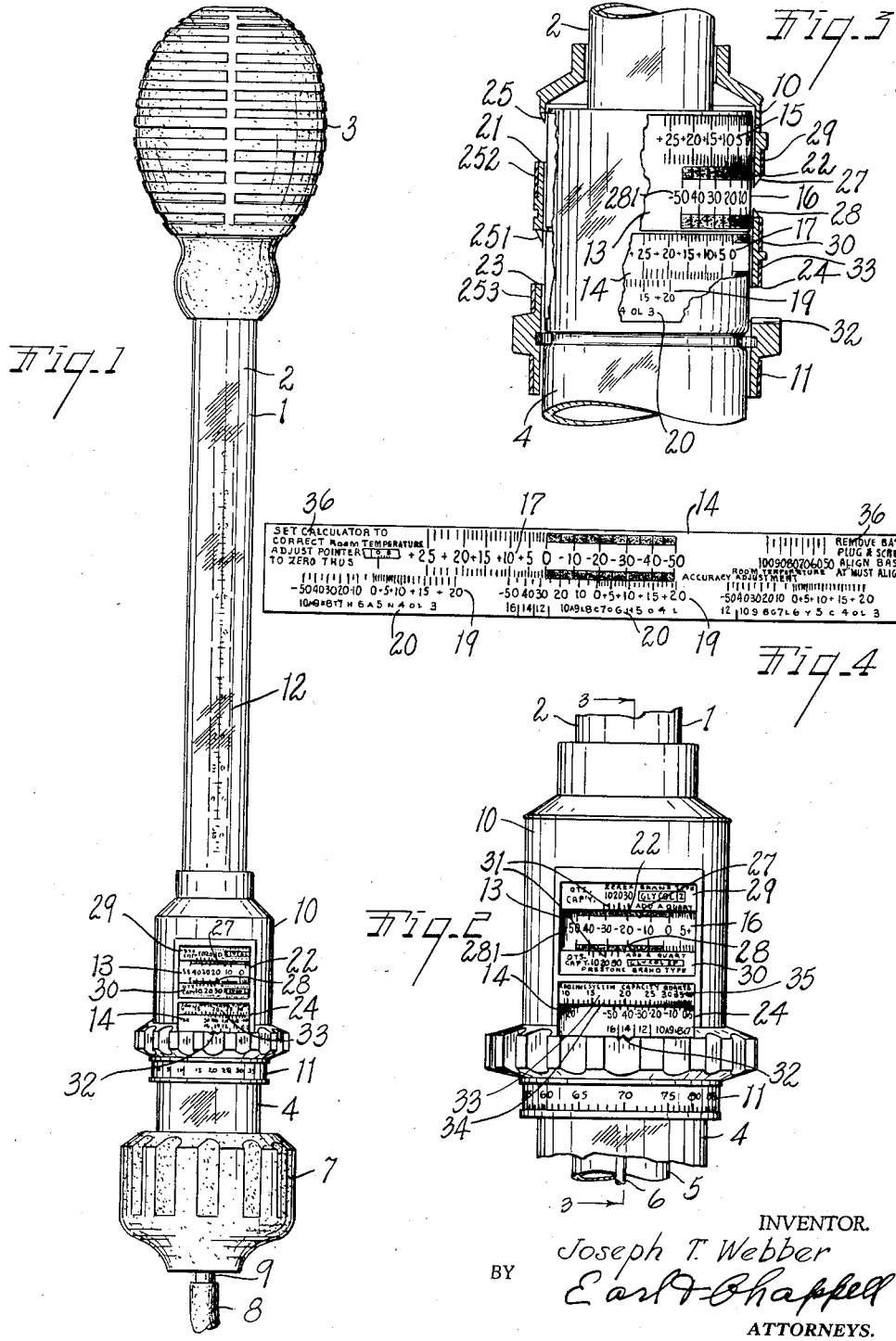

2,288,561

UNITED STATES PATENT OFFICE 2,288,561

THERMOHYDROMETER AND CALCULATING DEVICE THEREFOR

Joseph T. Webber, Kalamazoo, Mich., assignor to Roscoe B. Lacey, Kalamazoo, Mich.

Application May 29, 1941, Serial No. 395,713

14 Claims. (Cl. 265—46)

This invention relates to improvements in thermohydrometer and calculating device therefor.

The main objects of this invention are:

First, to provide an improved thermohydrometer or like instrument for testing liquids, for example, the anti-freeze solution used in automobile radiators, which instrument has a calculating device associated therewith for quickly ascertaining the freezing point or other attribute of the solution dependent on temperature corrected specific gravity, and for ascertaining other useful information pertaining to the solution.

Second, to provide an instrument of the type described equipped with a calculating device having means for quickly indicating the effect on a characteristic of a solution or liquid mixture dependent on specific gravity which will result upon further predetermined treatment or concentration of the solution.

Third, to provide a thermohydrometer and calculating device of the type described enabling the operator to quickly ascertain the foregoing information, and in addition to ascertain the amount of anti-freeze material or agent which need be initially added to the cooling system to impart a predetermined anti-freeze or other characteristic thereto.

Fourth, to provide a combined thermohydrometer and calculator of the foregoing type which is simple, compact and economical in its parts, and which operates with a high degree of accuracy.

Further objects relating to details and economies of my invention will appear from the description to follow. The invention is defined in the claims.

A structure embodying the features of my invention is illustrated in the accompanying drawing, wherein:

Fig. 1 is a view in front elevation illustrating the instrument in accordance with the present invention.

Fig. 2 is an enlarged fragmentary front elevational view more clearly indicating the various coacting scales of the calculator device associated with and forming a part of the instrument.

Fig. 3 is an enlarged fragmentary view partially broken away and in section on line 3—3 of Fig. 2, further illustrating structural details of the coacting parts and the relative arrangement thereof on the instrument, and Fig. 4 is a view illustrating certain of the fixed scales of the instrument in developed or flat form to show the various calibrations and other information indicia carried thereby.

This application is a continuation in part of my copending application Serial No. 308,679, filed December 11, 1939, and deals in part with certain simplifications and refinements in the instrument illustrated and described in that application. In addition, the present invention comprehends an instrument having a calculating device of the type illustrated in the above identified application, which is, however, provided with further information imparting means enabling an operator to quickly and easily ascertain the anti-freeze requirements of a radiator cooling system of a given capacity, with reference to the quantity of anti-freeze necessary to add thereto in order to carry a liquid anti-freeze solution in the said radiator system to a predetermined desired and adequately low freezing point. Means for affording this last named result are incorporated in the calculating device of the instrument in an exceedingly simple and compact form, and the freezing point determining structure constituting the subject matter of the above identified copending application has likewise been considerably simplified, so that the present instrument, all in all, is an exceedingly compact and simple one. However, notwithstanding this, it operates with a high degree of accuracy.

Referring to the drawing the reference numeral 1 in general indicates the thermohydrometer instrument of my invention which includes a glass or other transparent barrel 2 having fitted thereon a collapsible rubber bulb 3 by means of which liquid is drawn into and expelled from the barrel. The opposite end of barrel 2 is concentrically and axially overlappingly associated with a transparent cylindrical sleeve 4 which coacts with the barrel in constituting an air seal or air lock chamber 5 in which a temperature indicating element 6 is disposed. This element is connected to a bimetallic, coiled, thermally responsive member (not shown) and shifts angularly of the annular air seal chamber 5 when the bimetallic member expands and contracts under the influence of the temperature of the solution admitted to barrel 2. The sleeve is associated with a suitable base 7 housing the bimetallic member and into which liquid to be tested is admitted through a rubber tube 8 and fitting 9. The air seal chamber prevents the rise of liquid around the indicating element to obscure the same.

Details of construction of an instrument of this general type are illustrated and described in my copending application Serial No. 273,661, filed May 15, 1939, as well as in my copending application Serial No. 308,679 identified above, and reference may be had to these two copending applications for further information as to the structure and operation of the temperature indicator 6, inasmuch as this does not constitute a part of the present invention.

The present invention is concerned mainly with the rotatable calculator member 10 rotatably mounted on sleeve 4 and coacting with suitable indicia on the latter (to be described) to afford the desired information relative to the freezing point of the solution drawn into the barrel. Sleeve-like rotary calculating member 10, which is molded of a suitable plastic material, carries at the lower end thereof a circular or annular scale 11 which is calibrated in accordance with the calibrations on a graduated specific gravity float 12 housed in the barrel 2. In use, the calculating member is positioned with the calibration on scale 11 which corresponds to the graduation on the float coincident with the level of the liquid in the barrel aligned with the temperature indicator 6. With the calculator 10 so positioned the parts are in readiness for a direct reading relating to various attributes of the liquid tested dependent on specific gravity, as will now be described.

The sleeve 4 has fixedly applied thereto a pair of annular scale bearing strips 13, 14 surrounding the same, these strips being in the illustrated embodiment adhesively secured to the sleeve, and being suitably imprinted with various different sets of graduations or calibrations. Thus, the uppermost strip 13 carries a freezing point scale 15 calibrated non-linearly along its top and bottom edges and adapted to be used in the testing of one type of anti-freeze solution, for example, one having an alcohol base. Immediately beneath this scale on strip 13 is a generally similar scale 16 calibrated non-linearly along its top and bottom edges in terms of freezing point for two generally similar types of anti-freeze solution, though different than that to be tested on scale 15, for example, these solutions may be those having a glycol base solution. The lower strip 14 may be provided with a still further scale 17 suitably calibrated along its top and bottom edges for use with a further type of anti-freeze material, for example, methanol. By reason of the general similarity of alcohol and methanol in point of specific gravity, scales 15 and 17 are generally similar.

The invention is not particularly concerned with the manner in which these various scales are applied to the fixed part of the instrument. They may be imprinted on strips adhesively secured to the glass sleeve, or they may be applied by decalcomania process or they may be printed directly on the sleeve or any other method may be employed. It is important, however, that each thereof be positioned in such manner that it is visible through an individual window provided therefor in the calculating member 10 to be described, the said windows being appropriately labeled to enable an operator to select the desired scale appearing therethrough corresponding to the liquid solution which is tested.

It will be noted that the lowermost strip 14 has imprinted thereon a further scale 19 calibrated along its upper edge, i. e., medially of the strip, in terms of freezing point above and below zero Fahrenheit (see Figs. 3 and 4). In vertical alignment with the calibrations of scale 19, and along the lower edge of the strip 14 I provide further numerical indicia 20 relating to arbitrary quantities of pure undiluted anti-freeze material. These are employed in conjunction with the indications of calibrated scale 19 to ascertain the amount of anti-freeze agent which must be initially added to water in a cooling system not treated with anti-freeze in order to reduce the freezing point of the same to a desired point found on scale 19. This last named calculation, of course, depends on a further factor in addition to the desired freezing point and the amount of anti-freeze material needed, namely, the capacity of the radiator cooling system, however, since this is known for all makes of cars on the market, the desired information is readily had by suitable manipulation of calculating member 10 in a manner to be described.

Referring to Figs. 2 and 3 the calculating member 10 is provided with a plurality of viewing openings or windows 21, 22, 23 and 24, these windows being arranged in vertically spaced relation axially of the calculating member 10. The windows 21, 23 on the one hand and 22, 24 on the other are on diametrically opposite sides of the calculator.

Referring to Fig. 3, it will be noted that the windows 21, 23 on the left hand side (which do not appear in Figs. 1 and 2 by reason of the fact that they are on the far side of the instrument as viewed in those figures) are each provided with a downwardly extending pointer elements 25, 251 on the top edge thereof, these pointers coacting respectively with scales 15, 17 and being calibrated and oriented in a generally similar manner, although the respective scale markings thereof are offset laterally a predetermined amount. This similarity exists because of the fact that scales 15, 17 are employed in the testing of anti-freeze solutions of which the anti-freeze agent have roughly similar specific gravity. As stated, the upper scale 15 is, in the actual commercial embodiment of the instrument, employed in the testing of alcohol base solutions, while the lower scale 17 exposed by window 23 is employed in testing methanol base solutions. Suitable label strips 252, 253 secured to the calculator 10 adjacent and beneath the respective windows 21, 23 give notice to the operator of this fact.

Referring to Fig. 3 it will likewise be noted that the upper and lower calibrations on the scale 16 intermediate the scales 15, 17 are arranged reversely to those of scales 15, 17, i. e., with the indications of increasingly low below zero freezing points on the left hand end thereof, whereas on the scales 15, 17 the freezing points increasing from zero upwardly are disposed on the left hand end. This is because scale 16 is employed in testing two different glycol types of anti-freeze solutions in which the specific gravity of the anti-freeze is greater than that of water, whereas the alcohol and methanol base solutions tested by scales 15, 17 have a specific gravity less than that of water.

The window 22 through which scale 16 is viewed is provided with opposed upper and lower pointers 27, 28 slightly offset laterally relative to one another and coacting with the respective upper and lower scale markings of the scale 16. A single set of numerical freezing point indicia 281 serves for both the upper and lower calibrations of scale 16. Above and below window 22 respectively the label strips 29, 30 are provided, indicating the fact that the pointers 27, 28 are to be employed in reading off freezing points from scale 16 in accordance with whether one or another type of glycol base solution is being tested. Thus, as illustrated in Fig. 2, pointer 27 indicates on the top graduations of scale 16, the freezing point when the well known "Zerex" or "Glycol Z" type solution is tested, whereas strip 30 indicates that pointer 28 is to be used in conjunction with the bottom graduations of scale 16 in the testing of the well known "Prestone" or "Glycol P" type solution. All of the foregoing anti-freeze agents, namely, alcohol, methanol, "Zerex" and "Prestone" are commonly employed as radiator anti-freeze agents.

In determining the freezing point of a liquid in accordance with the present invention the same method is employed as is described in my applications Serial Nos. 273,661 and 308,679 identified above. The calculator member 13 is rotatably positioned with the calibration on the scale 11 corresponding to the uncorrected specific gravity of the solution, as determined by float 12, positioned in alignment with temperature indicator 6. When this is done the freezing point of the solution, corrected for the existent temperature thereof, is read off immediately from the appropriate scale by reference to the appropriate pointers 25, 251, 27 or 28, in accordance with the type of solution tested.

Referring to Fig. 2 it will be seen that the indicia strips 29, 30 adjacent window 22 are provided with arbitrarily calibrated or graduated markings 31 relating to the capacity in quarts of the radiator cooling system, and suitable indicia are provided on these strips to indicate the character of this last named calibration. The calibrations 31 extend to the top and bottom edges of the window 22 for coaction with the graduations of scale 16. In use, once the temperature corrected freezing point of the given solution has been ascertained in the manner described above, if the operator wishes to ascertain the freezing point to which an added quart or other predetermined volume of pure corresponding anti-freeze agent will carry the radiator solution, it is only necessary to note the calibration 31 corresponding to the capacity of the radiator system being tested, then by reference to the scale 16 adjacent the same to read off the freezing point to which an extra added quart of anti-freeze agent will carry the solution. For example, assuming a radiator capacity of 20 quarts and that "Glycol Z" or "Zerex" type anti-freeze solution is being tested, the pointer 27 in Fig. 2 shows that the present freezing point of the solution is 15 degrees below zero (—15°) and that an added quart of "Zerex" will carry the temperature to approximately —24°, this figure being arrived at by noting the position of the 20 quart capacity calibration on strip 29 relative to the markings of scale 16.

The indicia strips 252, 253 adjacent the alcohol and methanol windows 21, 23, respectively, are provided with similar calibrations 31, which are employed in a manner similar to that described above in ascertaining or predicting the freezing point to which a predetermined added quantity of anti-freeze agent will carry a given volume of an already adulterated solution.

Scale 20 on the inner sleeve 4 materially supplements and completes the information afforded by the above described structure, in that it enables a gasoline station or garage attendant to quickly and accurately determine and to advise his customer as to the freezing point to which a given volume of water (untreated or unmixed with an anti-freeze agent) in the radiator cooling system of his car will be initially carried by the mixing therein of a given amount of anti-freeze agent; that is, scale 20 and the means associated with it (to be described) enable the attendant to determine readily, quickly and accurately the amount of anti-freeze agent necessary to be initially included in the contents of the radiator cooling system of any automobile or other system in order to carry the freezing point thereof to a predetermined desired and sufficiently low freezing point.

The freezing point scale 19 and the numerical "quarts required" indicia 20 associated therewith are viewed through window 24, which is provided with a pointer nib or element 32 (see Figs. 2 and 3). Above the window 24 I provide a label strip 33 which is calibrated at 34, (see Fig. 2), in terms of quarts capacity of the cooling system. This calibration is a non-linear one, the calibrations or markings at the left hand side thereof being relatively widely spaced and progressively diminishing in spacing to the right. Calibrations 19 and indicia 20 are likewise non-uniformly spaced but the spacing of both decreases to the left. Strip 33 is provided with appropriate indicia 35 to indicate the significance of the calibrations 34 thereon.

As stated, scale 19 on the glass sleeve 4 is in terms of freezing points and the numerical indicia 20 relate to requisite volumes of pure anti-freeze agent, and in use the operator simply selects on the calculator scale 34 a calibration corresponding to the radiator capacity of the automobile being tested, positions the same in alignment with the freezing point on scale 19 to which it is desired to insure the solution against freezing and, referring to the indicator pointer nib 32, reads off from the numerical indicia 20 the exact amount of anti-freeze agent which will be necessary for this purpose. For example, in Fig. 2, assuming that the capacity of the cooling system is 20 quarts of water and it is desired to carry the freezing point to say minus 40 degrees or thereabouts, the nib 32 indicates that the addition of approximately 14 quarts of alcohol will carry the freezing point to this temperature. The same amount of the same agent would carry a system of 25 quarts capacity to a freezing point of approximately minus 23 degrees.

It will be noted that the strip 14 has several sets of calibrations and numerical indicia 19, 20, respectively, relating to the various types of anti-freeze agents which this instrument handles, namely, methanol, alcohol and glycol (see Fig. 4). The particular anti-freeze agent for each set is indicated by appropriate lettering or wording interspersed between and separating the numerals 20. Strip 14 carries other indicia visible through the window 23 which is used in initially adjusting the instrument for accuracy in assembling and the like, such being indicated by the reference numeral 36. These indicia, however, are not employed in the actual testing operations.

From the foregoing it will be appreciated that the present instrument represents practically the ultimate in versatility in instruments of this type. It enables an attendant to immediately ascertain any required information relating to the various anti-freeze agents and solutions made up therefrom. It is useful whether the cooling liquid of the customer's automobile presently contains an anti-freeze agent or not. As such the present instrument is a great business getter. Moreover, by employing a rotatory system of calibration, spreading the calibrations on the scale 11 over the entire periphery thereof it is possible to cover a wide range of float readings while still enabling the float markings and markings on the scale 11 to be relatively widely separated. This takes care of radiator cooling solutions of practically any degree of concentration employing any of the well known types of anti-freeze agents and at the same time contributes to increase accuracy of the readings.

The specific gravity scale 11 may be positioned coincident with temperature indicator 6 with great accuracy by reason of this wider spreading of the markings, which accuracy is reflected in the subsequent readings which are taken from the various scales 15, 16 and 17. It is easily demonstrable that the accuracy and reliability of the present instrument are not approached in any other instrument of its general type.

In the preceding description reference has been made to the testing of anti-freeze agents for automobile radiator cooling systems. However, it will be evident that devices incorporating the features of the present invention are not necessarily limited to this particular field. For example, with slight changes in the scheme of calibration, the instrument could be readily converted to the testing of boiling points, or it could be employed in testing battery solutions, or in reading proofs and the like in the blending of liquors, etc., necessary revisions for these purposes or other purposes allied thereto will readily suggest themselves to those skilled in the art.

Embodiments of the invention which incorporate the principles of the invention in a highly desirable manner have been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. A liquid testing device having a temperature indicating element positionable on the device in response to the temperature of the liquid tested, a calculating member rotatably mounted on said device and provided with means positionable in alignment with said element to set the member in temperature corrected specific gravity relation to the device, said container having a scale thereon beneath said calculating member calibrated in terms of freezing point and the calculating member being provided with a window having a pointer adjacent the same through which said scale is viewed, the pointer coacting with the calibrations of said scale to designate the freezing point of the liquid corrected for the existing temperature thereof, said calculating member being calibrated adjacent said window and pointer in terms of volumes of liquid for coaction with the scale calibrations in ascertaining the altered freezing point of a given volume of the liquid attendant upon the addition of a given quantity of anti-freeze agent thereto, a further scale positioned on said device beneath said calculating member, said last named scale being likewise calibrated in terms of freezing point and having numerical indicia disposed adjacent and in predetermined relation to the calibrations thereon, said indicia expressing quantities of anti-freeze agent, said calculating member having a window through which said last named scale and indicia are viewed and being calibrated in terms of liquid volumes adjacent said last named scale for coaction with said last named scale in setting up a predetermined relation of a given volume to a given desired freezing point, said calculating member having a pointer adjacent said last named window coacting with said indicia in indicating a given indicium thereof representing a quantity of said agent requisite to produce the aforesaid relation of volume and freezing point.

2. A liquid testing device having a temperature indicating element positionable on the device in response to the temperature of the liquid tested, a calculating member rotatably mounted on said device and provided with means positionable in alignment with said element to set the member in temperature corrected specific gravity relation to the device, said device having a scale calibrated in terms of freezing point and the calculating member having means coacting with the calibrations of said scale to designate the freezing point of the liquid corrected for the existing temperature thereof, said calculating member being calibrated in terms of volumes of liquid for coaction with the scale calibrations in ascertaining the altered freezing point of a given volume of the liquid attendant upon the addition of a given quantity of anti-freeze agent thereto, a further scale on said device calibrated in terms of freezing point and having numerical indicia disposed adjacent and in predetermined relation to the calibrations thereon, said indicia expressing quantities of anti-freeze agent, said calculating member having a window through which said last named scale and indicia are viewed and being calibrated in terms of liquid volumes adjacent said last named scale for coaction with said last named scale in setting up a predetermined relation of a given volume to a given desired freezing point, said calculating member having means coacting with said indicia in indicating a given indicium thereof representing a quantity of said agent requisite to produce the aforesaid relation of volume and freezing point.

3. A liquid testing device having a temperature indicating element positionable on the device in response to the temperature of the liquid tested, a calculating member adjustably mounted on said device and provided with means positionable in alignment with said element to set the member in temperature corrected specific gravity relation to the device, said device having a scale calibrated in terms of freezing point and the calculating member having means coacting with the calibrations of said scale to designate the freezing point of the liquid corrected for the existing temperature thereof, said calculating member being calibrated in terms of volumes of liquid for coaction with the scale calibrations in ascertaining the altered freezing point of a given volume of the liquid attendant upon the addition of a given quantity of anti-freeze agent thereto, a further scale on said device calibrated in terms of freezing point and having numerical indicia disposed adjacent and in predetermined relation to the calibrations thereon, said indicia expressing quantities of anti-freeze agent, said calculating member being calibrated in terms of liquid volumes adjacent said last named scale for coaction with said last named scale in setting up a predetermined relation of a given volume to a given desired freezing point, said calculating member having means coacting with said indicia in indicating a given indicium thereof representing a quantity of said agent requisite to produce the aforesaid relation of volume and freezing point.

4. In a device of the type described, a support, a calculating member adjustably mounted on said support and provided with means for setting the member in predetermined adjusted relation to the support, said support having a scale calibrated in terms of freezing point and the calculating member having means coacting with the calibrations of said scale to designate the freezing point of the liquid, said calculating member being calibrated in terms of volumes of liquid for coaction with the scale calibrations in ascertaining the altered freezing point of a given volume of the liquid attendant upon the addition of a given quantity of anti-freeze agent thereto, a further scale on said support calibrated in terms of freezing point and having numerical indicia disposed adjacent and in predetermined relation to the calibrations thereon, said indicia expressing quantities of anti-freeze agent, said calculating member being calibrated in terms of liquid volumes adjacent said last named scale for coaction with said last named scale in setting up a predetermined relation of a given volume to a given desired freezing point, said calculating member having means coacting with said indicia in indicating a given indicium thereof representing a quantity of said agent requisite to produce the aforesaid relation of volume and freezing point.

5. In a liquid testing device having a thermally positionable temperature indicating element subject to the temperature of the liquid tested and positioned thereby, a calculating member adjustably mounted on said device for predetermined positioning relative to said element, said device being scaled beneath said calculating member in terms of a characteristic of a liquid dependent on its specific gravity, said calculating member having means for viewing said scale and indicator means coacting with the scale when the calculating member is appropriately positioned with reference to said temperature indicating element for indicating said characteristic of the liquid corrected for temperature, said calculating member being calibrated adjacent said indicator means in terms of volumes of the liquid tested for coaction with said scale in indicating said characteristic for a given volume of the liquid attendant upon predetermined further treatment thereof, and a further scale disposed beneath said calculating member calibrated in terms reflecting said first named characteristic and having treatment indicating indicia arranged thereon in predetermined relation to the respective calibrations thereof, said calculating member having a window for viewing said last named scale and being calibrated adjacent the same in terms of volume of liquid to be initially treated, the last named calibrations coacting with the calibrations of said last named scale when the calculating member is appropriately positioned relative thereto in defining predetermined characteristics of the liquid as initially treated, with reference to predetermined volumes thereof, said calculating member having means coacting with said treatment indicating indicia to select an indicium therefrom corresponding to said characteristic for a given volume of liquid as set up by said last named positioning of the member.

6. In a liquid testing device having a thermally positionable temperature indicating element subject to the temperature of the liquid tested and positioned thereby, a calculating member adjustably mounted on said device for predetermined positioning relative to said element, said device being scaled adjacent said member in terms of a characteristic of a liquid dependent on its specific gravity, said calculating member coacting with the scale when the calculating member is appropriately positioned with reference to said temperature indicating element for indicating said characteristic of the liquid corrected for temperature, said calculating member being calibrated adjacent said indicator means in terms of volumes of the liquid tested for coaction with said scale in indicating said characteristic for a given volume of the liquid attendant upon predetermined further treatment thereof, and a further scale adjacent said calculating member calibrated in terms reflecting said first named characteristic and having treatment indicating indicia arranged thereon in predetermined relation to the respective calibrations thereof, said calculating member being calibrated adjacent the last named scale in terms of volume of liquid to be initially treated, the last named calibrations coacting with the calibrations of said last named scale when the calculating member is appropriately positioned relative thereto in defining predetermined characteristics of the liquid as initially treated, with reference to predetermined volumes thereof, said calculating member having means coacting with said treatment indicating indicia to select an indicium therefrom corresponding to said characteristic for a given volume of liquid as set up by said last named positioning of the member.

7. In a device of the type described, a base, a calculating member adjustably mounted on said base for predetermined positioning relative thereto, said base being scaled adjacent said member in terms of a characteristic of a liquid dependent on its specific gravity, said calculating member coacting with the scale when the calculating member is appropriately positioned on the base for indicating said characteristic of the liquid, said calculating member being calibrated in terms of volumes of the liquid tested for coaction with said scale in indicating said characteristic for a given volume of the liquid attendant upon predetermined further treatment thereof, and a further base scale adjacent said calculating member calibrated in terms reflecting said first named characteristic and having treatment indicating indicia arranged thereon in predetermined relation to the respective calibrations thereof, said calculating member being calibrated adjacent the last named scale in terms of volume of liquid to be initially treated, the last named calibrations coacting with the calibrations of said last named scale when the calculating member is appropriately positioned relative thereto in defining predetermined characteristics of the liquid as initially treated, with reference to predetermined volumes thereof, said calculating member having means coacting with said treatment indicating indicia to select an indicium therefrom corresponding to said characteristic for a given volume of liquid as set up by said last named positioning of the member.

8. In a thermohydrometer testing device having a base supporting a thermally positionable temperature indicating member subject to the temperature of the liquid tested and positioned thereby, a calculating member adjustably mounted on said base for predetermined positioning relative to said member, said base being scaled adjacent said calculating member in terms of a characteristic of a liquid dependent on its specific gravity, said calculating member having means for viewing said base scale and pointer means coacting with the scale when the calculating member is appropriately positioned with reference to said temperature indicating element for indicating said characteristic of the liquid corrected for temperature, and a further scale on the base adjacent said calculating member calibrated in terms reflecting said first named characteristic and having treatment indicating indicia arranged thereon in predetermined relation to the respective calibrations thereof, said calculating member having a window for viewing said last named scale and being calibrated adjacent the same in terms of volume of liquid to be treated, the last named calibrations coacting with the calibrations of said last named scale when the calculating member is appropriately positioned relative thereto in defining predetermined characteristics of the liquid with reference to predetermined volumes thereof, said calculating member having means coacting with said indicia to select an indicium therefrom corresponding to the treatment requisite to produce said characteristic for a given volume of liquid as set up by said last named positioning of the member.

9. In a thermohydrometer testing device having a base, a calculating member adjustably mounted on said base for predetermined positioning, said base being scaled adjacent said calculating member in terms of a characteristic of a liquid dependent on its specific gravity, said calculating member coacting with the scale when the calculating member is appropriately positioned for indicating said characteristic of the liquid, and a further scale on the base adjacent said calculating member calibrated in terms reflecting said first named characteristic and having treatment indicating indicia arranged thereon in predetermined relation to the respective calibrations thereof, said calculating member, calibrated adjacent the last named scale in terms of volume of liquid to be treated, the last named calibrations coacting with the calibrations of said last named scale when the calculating member is appropriately positioned relative thereto in defining predetermined characteristics of the liquid with reference to predetermined volumes thereof, said calculating member having means coacting with said indicia to select an indicium therefrom corresponding to the treatment requisite to produce said characteristic for a given volume of liquid as set up by said last named positioning of the member.

10. In a testing instrument of the type described having means for indicating the temperature of a liquid tested and means for indicating the specific gravity of the liquid, a calculating member rotatably mounted on said instrument for adjustment thereon relative to said temperature indicating means by reference to the specific gravity indicating means, said instrument having a calibrated scale calibrated in terms of freezing point and said calculating member having indicator means coacting with said scale, the latter being viewable in relation to said means when the calculating member is adjustably positioned to indicate the freezing point of the liquid, a further scale on said instrument likewise calibrated in terms of freezing point, said instrument having numerical indicia relating to volumes of liquid anti-freeze agent which are predeterminedly positioned in respect to the last named calibrations, and a scale and indicator on said calculating member adjustably positionable in relation to said further scale and said indicia, respectively, by rotation of the calculating member, said calculating member scale being calibrated in terms of volume of liquid of the system being tested and the calibrations thereof being positionable with reference to the calibrations of said further scale to define predetermined relationships of volumes and freezing points, said indicator coacting with said indicia in selecting one thereof corresponding to a given relationship set up by said last named positioning of the calculating member and last named scale.

11. In a testing instrument of the type described having means for indicating the temperature of a liquid tested and means for indicating the specific gravity of the liquid, a calculating member rotatably mounted on said instrument for adjustment thereon relative to said temperature indicating means by reference to the specific gravity indicating means, said instrument having a calibrated scale and said calculating member having indicator means coacting with said scale, the latter being viewable in relation to said means when the calculating member is adjustably positioned, a further scale on said instrument calibrated similarly to the first scale, said instrument having numerical indicia relating to treatment of the liquid to produce a predetermined characteristic therein, which indicia are predeterminedly positioned in respect to the last named calibrations, and a scale and indicator on said calculating member adjustably positionable in relation to said further scale and said indicia, respectively, by rotation of the calculating member, said calculating member scale being calibrated in terms of volume of liquid of the system being tested and the calibrations thereof being positionable with reference to the calibrations of said further scale, said indicator coacting with said indicia in selecting one thereof corresponding to a given relationship set up by said last named positioning of the calculating member and last named scale.

12. A device for furnishing information relating to a liquid based on the temperature and specific gravity of the liquid, comprising a support and a calibrating member adjustably positionable on the support, said support and calibrating member having coacting specific gravity and temperature designating means predeterminedly positionable relative to one another for positioning said member on the support, and said support being scaled adjacent said calculating member in terms of a characteristic of a liquid dependent on its specific gravity, said calculating member coacting with the scale when the calculating member is appropriately positioned for indicating said characteristic of the liquid, and a further scale on the support adjacent said calculating member calibrated in terms reflecting said first named characteristic and having treatment indicating indicia arranged thereon in predetermined relation to the respective calibrations thereof, said calculating member being calibrated adjacent the last named scale in terms of volume of liquid to be treated, the last named calibrations coacting with the calibrations of said last named scale when the calculating member is appropriately positioned relative thereto in defining predetermined characteristics of the liquid with reference to predetermined volumes thereof, said calculating member having means coacting with said indicia to select an indicium therefrom corresponding to the treatment requisite to produce said characteristic for a given volume of liquid as set up by said last named positioning of the member.

13. A device for furnishing information relating to a liquid based on the temperature and specific gravity of the liquid, comprising a support and a calibrating member adjustably positionable on the support, said support and calibrating member having coacting means predeterminedly positionable relative to one another for positioning said member on the support, said support having a scale calibrated in terms of an attribute dependent on specific gravity and said calculating member having indicator means coacting with said scale to afford information relating to said attribute when the calculating member is adjustably positioned, a further scale on said support calibrated similarly to the first scale, said support having indicia relating to treatment of the liquid to produce a predetermined effect thereon, which indicia are predeterminedly positioned in respect to and coact with said last named calibrations to afford information relating to said treatment, and a scale and indicator on said calculating member adjustably positionable in relation to said further scale on the support and said indicia, respectively, said calculating member scale being calibrated in terms of volume of liquid of the system being tested and the calibrations thereof being positionable with reference to the calibrations of said further scale, said last named indicator coacting with said indicia in selecting one thereof corresponding to a given relationship set up by said last named positioning of the calculating member and last named scale.

14. A device for furnishing information relating to a liquid based on the temperature and specific gravity of the liquid, comprising a support and a calibrating member adjustably positionable on the support, said support and calibrating member having coacting means predeterminedly positionable relative to one another for positioning said member on the support, said support having a scale calibrated in terms of an attribute dependent on specific gravity, said support having indicia relating to treatment of the liquid to produce a predetermined effect thereon, which indicia are predeterminedly positioned in respect to and coact with said last named calibrations to afford information relating to said treatment, and a scale and indicator on said calculating member adjustably positionable in relation to said scale on the support and said indicia, respectively, said calculating member scale being calibrated in terms of volume of liquid of the system being tested and the calibrations thereof being positionable with reference to the calibrations of said scale, said last named indicator coacting with said indicia in selecting one thereof corresponding to a given relationship set up by said last named positioning of the calculating member and scale.

JOSEPH T. WEBBER.